Jan. 20, 1959 W. S. EDSALL 2,870,293

AUTOMATIC CIRCUIT INTERRUPTER INTEGRATED WITH CURRENT-LIMITING FUSES

Filed Oct. 31, 1957

Inventor:
William S. Edsall,
by
Attorney

United States Patent Office 2,870,293
Patented Jan. 20, 1959

2,870,293

AUTOMATIC CIRCUIT INTERRUPTER INTEGRATED WITH CURRENT-LIMITING FUSES

William S. Edsall, Boston, Mass., assignor to The Chase-Shawmut Company, Newburyport, Mass.

Application October 31, 1957, Serial No. 693,627

5 Claims. (Cl. 200—114)

This invention relates to switching devices backed-up by serially connected electric fuses for short-circuit current protection of the switching devices. From a more limited point of view this invention has reference to the protection of automatic switching devices or circuit interrupters, particularly so-called molded case circuit breakers, by current-limiting fuses which are integrated with the molded case circuit breakers to jointly form unitary structures.

Integration of switching devices and fuses for back-up protection thereof involves difficult space problems and difficult thermal problems. If the fuses are to be housed inside the housing or casing of the switching device, i. e., if both the switching device and the fuses are to be housed in a common housing or casing, this calls for drastic changes of existing housings of switching devices to provide space therein for accommodating the fuses and the fuse holders for the fuses. The arrangement of switching devices and of fuses in the same housing results in mutual heating of these two kinds of devices, tending to impair their proper operation, or calling for means to remove the tendency for improper operation established by increased, or excessive, heat generation inside a relatively limited space.

It is one object of this invention to provide improved integral switching devices and back-up fuse units not subject to the aforementioned limitations.

The problem of protecting switching devices by back-up current limiting fuses arises frequently many years after the installation of the switching devices in a distribution system. Under such circumstances it is generally desired to supplement installed switching devices by current-limiting fuses rather than to substitute the switching devices by other switching devices having built-in current-limiting fuses.

It is another object of the invention to provide composite structures including a switching device and current-limiting back-up fuses which structures can readily be assembled in the field by combining installed conventional switching devices, such as so-called molded case circuit breakers, with current-limiting fuses of a special novel type.

Another object of the invention is to provide composite structures including switching devices and current-limiting back-up fuses therefor wherein special fuse holder means are dispensed with, the current-limiting fuses being supported by the frame or base of the switching devices and having terminal elements adapted to be brought into immediate physical engagement with the cable connectors on the base or frame of the switching devices.

Another object of the invention is to provide a method for attaching current-limiting fuses to the bases of switching devices in such a way that the switching devices may be mounted at will either in front of a panel or on the rear thereof.

Another object of the invention is to provide composite structures including switching devices and current-limiting fuses which structures are less expensive to manufacture and easier to assemble than comparable composite prior art devices.

Still another object of the invention is to provide compact composite structures including automatic switching devices and current-limiting fuses adapted to preclude single-phasing without resorting to striker pin means for tripping the automatic switching devices upon blowing of any of the current-limiting fuses.

The foregoing and other general and special objects of the invention and advantages thereof will more clearly appear from the ensuing particular description of the invention, as illustrated in the accompanying drawing, wherein.

Figure 2:
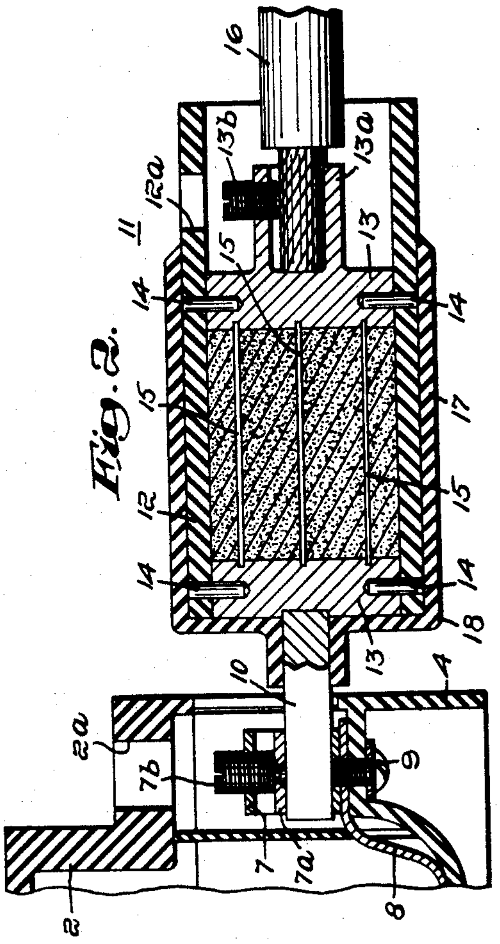
Fig. 2 is a section along 2—2 of Fig. 1.
Figure 3:
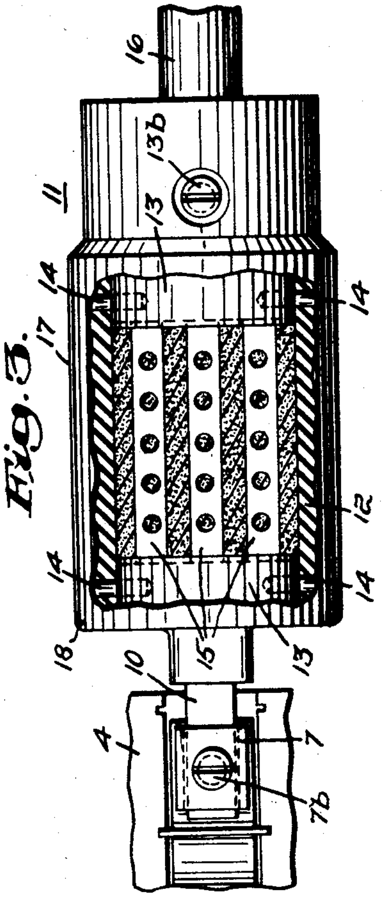
Fig. 3 is a top-plan view of the structure shown in Fig. 2, some of the constituent parts thereof being shown as being broken away, and some being shown in cross-section.
Figure 1:
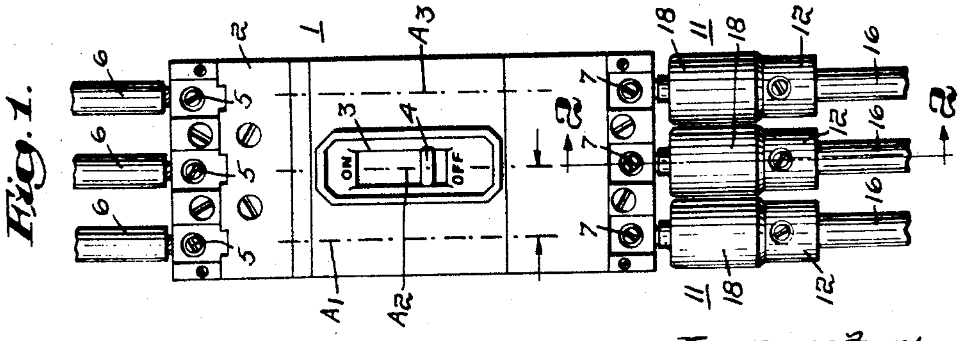
Fig. 1 is a top plan view of a composite circuit breaker and current-limiting fuse structure embodying the invention.

Referring now to the drawing, and more particularly to Fig. 1 thereof, numeral 1 has been applied to generally indicate an automatic switching device, or molded case circuit breaker, comprising a cover 2 having a slot 3 therein through which handle 4 projects. Circuit breaker 1 may be of any conventional design. It is of the multipolar type, as generally used in three phase, or other multiphase, A.-C. distribution systems, and comprises three pole units arranged under the common cover 2, diagrammatically indicated by three dash-and-dot lines $A_1$, $A_2$, $A_3$. The cover 2 of circuit breaker 1 is mounted on a frame or base 4 of insulating material, such as phenolic resin. As shown in Fig. 1 the upper portion of frame or base 4 supports three cable connectors 5 of which each receives the bare end of a cable 6. Cover 2 extends over the cable connectors 5, and is provided with circular perforations or holes giving access to set-screws for tightening cable connectors 5. The lower portion of frame or base 4 supports three cable connectors 7 of which each comprises a clamping plate *7a* adapted to be tightened by a set-screw *7b*. Each pole unit $A_1$, $A_2$, $A_3$ is conductively connected to one of cable connectors 7 by a metal strap 8. Screws 9 secure cable connector clamps 7 and metal straps 8 to base or frame 4. Cover 2 is provided with a plurality of circular apertures or holes *2a* giving access to set-screws *7b* of cable connectors 7. Each cable connector 7 is engaged by a copper rod 10, preferably square in cross-section, forming an integral part of one of three current-limiting fuses generally indicated by reference numeral 11. Each of the current-limiting fuses 11 comprises a tubular casing 12 of insulating material closed on both ends by terminal elements 13 in the form of copper plugs. Angularly displaced steel pins 14 firmly secure copper plugs 13 to casings 12. Multiperforated ribbon-type fuse links 15, preferably of silver, conductively interconnect the copper plugs 13 of each fuse 11. The links or fusible conductors 15 are immersed in a pulverulent arc-quenching filler, preferably chemically substantially pure quartz sand. As shown in Figs. 2 and 3 copper rods 10 form integral parts of the left copper plugs 13. Rods 10 may be brazed to copper plugs 13 at the ends thereof engaging copper plugs 13. As an alternative, plugs 13 and copper rods 10 may be formed by an integral forging. As shown in Figs. 2 and 3, the right copper plugs 13 are provided with sleeves or sleeve-shaped extensions *13a* preferably formed by machining and adapted to receive the bare ends of cables 16. The length of casings 12 exceeds the distance between axially outer surfaces of plugs 13. The ends of casings 12 adjacent sleeves *13a* project beyond sleeves *13a*, thus forming housings for sleeves 13a. Circular perforations or holes 12a in casings 12 give access to set-screws 13b clamping the bare ends of cables 16 to sleeves 13a. The distances between the poles of circuit breaker 1, generally referred to as pole spacing s, limits the diameter which can be given to the casings 12 of current-limiting fuses 11. The outer diameter of fuses 11 ought to be smaller than the pole spacing s of circuit breaker 1. Even if fuses 11 are constructed as compact as possible, the diameter of casings 11 must be fairly close to the pole spacing s of circuit breaker 1. As a result, the distance between live part of adjacent fuses in different phases of the three phase circuit is substantially less than the permissible minimum distance between live parts in air. The distance between live parts is smallest between the radially outer ends of fastener pins 14 of adjacent fuses 11. It may also be less at other points of adjacent current-limiting fuses than the safe minimum distance between live parts in air, e. g., between adjacent plugs 13, or adjacent connector rods 10. To avoid the danger of flash-over between adjacent fuses, their live parts are separated by appropriate barrier means of insulating material. Reference numeral 18 has been applied to indicate such barrier means in the shape of a cap or sleeve of insulating material covering the radially outer ends of pins 14, the axially outer surfaces of plugs 13 adjacent circuit breaker 1, and a portion of rod connectors 10. If desired, or necessary, the portions of caps 18 covering rod connectors 10 may be extended farther axially outwardly than shown in the drawing.

It will be apparent from Fig. 1 that one of each of the three pole units $A_1$, $A_2$, $A_3$ of circuit breaker 1, one of each of the three cable connectors 7 of circuit breaker 1, and one of each of the three current-limiting fuses 11 are arranged in alignment. The three current-limiting fuses 11 are arranged in a plane generally parallel to cover 2 and frame structure 4. Fuses 11 are supported by, but extend beyond, frame structure 4 and cover 2 thereof. Connector rods 10 are male connecting elements engaging the female cable connectors 7 originally provided on circuit breaker 1 for receiving the ends of cables 16. One of these cables 16 is shown in Figs. 2 and 3 to be inserted into one of cable connectors 13a, 13b. The portion of each casing 12 forming a housing for one of the cable connectors 13a, 13b greatly increases the air spacing between adjacent live parts of current-limiting fuses 11 at the ends thereof remote from circuit breaker 1.

It will be apparent from the foregoing that the fuses 11 may be attached to circuit breaker 1 on the line side, or on the load side, as desired. If attached on the load side, the circuit breaker 1 forms an effective disconnect means for the current-limiting fuses 11.

The embodiment of the invention shown in Fig. 1 refers to an automatic switch or circuit breaker mounted in front of a panel. Substantially the same arrangement may be applied for switches or circuit breakers mounted on the rear of a panel, except that in the latter case the panel ought to be provided with an opening, normally closed by a cover plate, enabling inspection of the fuses, and replacement of blown fuses.

Upon blowing of any of the three current-limiting fuses 11 the circuit breaker 1 is being tripped by the let-through current through the fuses, and then interrupts all three phases of the faulted multiphase circuit, thus precluding single-phasing. The circuit breaker 1 is being tripped irrespective of whether all the fuses, or less than all the fuses, in the multiphase circuit blow.

Having disclosed a preferred embodiment of my invention it is desired that the same be not limited to the particular structure disclosed. It will be obvious to any person skilled in the art that many modifications and changes may be made without departing from the broad scope and spirit of the invention. Therefore it is desired that the invention be interpreted broadly, and that it be limited only as required by the prior state of the art.

I claim as my invention:

1. In combination a multipolar switching device, a frame structure supporting the constituent parts of said switching device, a plurality of cable connectors supported by said frame structure each in alignment with one pole of said switching device and each comprising a clamping plate and a set-screw, and a plurality of fuses arranged substantially beyond said frame structure in a plane generally parallel thereto each in alignment with one pole of said switching device, each of said plurality of fuses comprising a casing, a pair of terminal elements closing both ends of said casing, fusible means inside of said casing conductively interconnecting said pair of terminal elements, a male connector on one of said pair of terminal elements projecting into one of said plurality of cable connectors on said frame structure, and a female cable connector on the other of said pair of terminal elements.

2. In combination a multipolar switching device, a frame structure supporting the constituent parts of said switching device, a plurality of female connector clamps supported by said frame structure each in alignment with one pole of said switching device, and a plurality of fuses each arranged substantially beyond said frame structure and in alignment with one pole of said switching device, each of said plurality of fuses comprising a casing, a pair of terminal plugs closing both ends of said casing, fusible means inside said casing conductively interconnecting said pair of plugs, transverse pins for attaching said casing to said pair of plugs, insulating means for covering the radially outer ends of said pins, a male connector element on one of said pair of plugs engaging one of said plurality of female connector clamps, and a female connector clamp on the other of said pair of plugs.

3. In combination a multipolar switching device having a predetermined pole spacing, a frame structure supporting the constituent parts of said switching device, a plurality of female connector clamps supported by said frame structure each in alignment with one pole of said switching device, and a plurality of fuses arranged substantially beyond said frame structure each in alignment with one pole of said switching device, each of said plurality of fuses comprising a casing having a smaller diameter than said predetermined pole spacing, a pair of terminal plugs closing both ends of said casing, fusible means conductively interconnecting said pair of terminal plugs, transverse pins for attaching said casing to said pair of plugs, insulating sleeve means mounted on said casing covering the radially outer ends of said pins, a male connector element on one of said pair of plugs engaging one of said plurality of female connector clamps, and a female connector clamp on the other of said pair of plugs.

4. In combination a switching device, a frame structure of insulating material supporting the constituent parts of said device, cable connector clamp means on said frame structure comprising a clamping plate and a set screw, and a current-limiting back-up fuse for said device arranged substantially beyond said frame structure, said fuse comprising a casing, a pair of plugs closing both ends of said casing, fusible element means inside said casing conductively interconnecting said pair of plugs, a connector rod substantially square in cross-section forming an integral part of one of said pair of plugs projecting from said one of said pair of plugs into said cable connector clamp means and held in position by the action thereof, and a cable connector sleeve adapted to receive the bare end of a cable forming an integral part of the other of said pair of plugs.

5. In combination a switching device, a frame structure of insulating material supporting the constituent parts of said device, cable connector clamp means on said frame structure comprising a clamping plate and a set-screw, and a current-limiting back-up fuse for said device arranged substantially beyond said frame structure, said fuse comprising a casing, a pair of terminal plugs closing both ends of said casing, transverse pins securing said pair of plugs to said casing, an insulating sleeve mounted on said casing covering the axially outer ends of said pins, fusible element means inside said casing conductively interconnecting said pair of plugs, a connector rod forming an integral part of one of said pair of plugs projecting from said one of said pair of plugs into said cable connector clamp means and held in position by the action thereof, a cable connector sleeve adapted to receive the bare end of a cable forming an integral part of the other of said pair of plugs, and the end of said casing adjacent said other of said pair of plugs forming a projection defining a housing accommodating said cable connector sleeve.

References Cited in the file of this patent

UNITED STATES PATENTS

| | | |
|---|---|---|
| 2,376,809 | Rawlins et al. | May 22, 1945 |
| 2,473,196 | Dannenberg | June 14, 1949 |
| 2,523,139 | Owens | Sept. 19, 1950 |
| 2,625,626 | Matthysse | Jan. 13, 1953 |
| 2,681,398 | Kozacka et al. | June 15, 1954 |
| 2,766,351 | Edsall | Oct. 9, 1956 |

FOREIGN PATENTS

| | | |
|---|---|---|
| 434,618 | Germany | Sept. 29, 1926 |